Sept. 28, 1937. A. L. CORSON Re. 20,518

PRESSURE ADJUSTING MEANS

Original Filed May 14, 1934 2 Sheets-Sheet 1

Inventor
Arthur L. Corson
by Harry Dexter Peck
Attorney

Sept. 28, 1937. A. L. CORSON Re. 20,518

PRESSURE ADJUSTING MEANS

Original Filed May 14, 1934 2 Sheets-Sheet 2

Inventor
Arthur L. Corson
by Harry Dexter Peck
Attorney

Reissued Sept. 28, 1937

Re. 20,518

UNITED STATES PATENT OFFICE 20,518

PRESSURE ADJUSTING MEANS

Arthur L. Corson, Malden, Mass., assignor, by mesne assignments, to Sears, Roebuck and Co., Chicago, Ill., a corporation of New York Original No. 2,012,157, dated August 20, 1935, Serial No. 725,614, May 14, 1934. Application for reissue March 17, 1937, Serial No. 131,412

9 Claims. (Cl. 112—236)

This invention relates to pressure adjusting means. More especially it relates to means for quickly adjusting the pressure exerted by the presser foot of a sewing machine from that required for ordinary sewing to that desirable for darning or embroidering, and vice versa.

In using an ordinary sewing machine for darning, it is customary to lift the presser foot from the material so that the latter can be moved freely to shift it back and forth during the formation of the darning stitches. This is not satisfactory, however, because there is liability of skipping stitches for the reason that the material will lift with the needle and thus the latter will fail to throw out loops of its thread to be entered by the shuttle or other loop-taking device. Because of the removal of the vertical restriction to the lifting of the material the thread is easily broken and since there is no mechanical aid in the positioning or guiding of the material, good darning is not ordinarily accomplished.

To be sure, the usual adjusting screw for varying the spring pressure exerted on the presser foot bar might be backed-off or turned down to vary the pressure exerted by the foot, but this is a slow method of adjustment and one by which any desired result must be approached by trial. Once the operator has adjusted this screw to give the proper pressure for sewing she is reluctant to change it for darning, not only because of the trouble of properly adjusting the pressure for darning but also because of the difficulty of again resetting the screw to restore the proper pressure for sewing.

It is an object of the present invention to provide simple means whereby the pressure exerted by the presser foot can be easily and quickly shifted from that suitable for sewing to that desirable for darning, and vice versa. It is a feature of the improved means that no alteration in the normal position of the presser foot itself is made, the foot remaining in proper position to strip the material from the needle and aid in the holding and guiding of the work.

The accompanying drawings show the best mode in which I have contemplated applying the principles of my invention but these are to be taken as merely illustrative for it is intended that the patent shall cover by suitable expression in the appended claims whatever features of patentable novelty exist in the invention as a whole.

Figures 1, 2, 3:
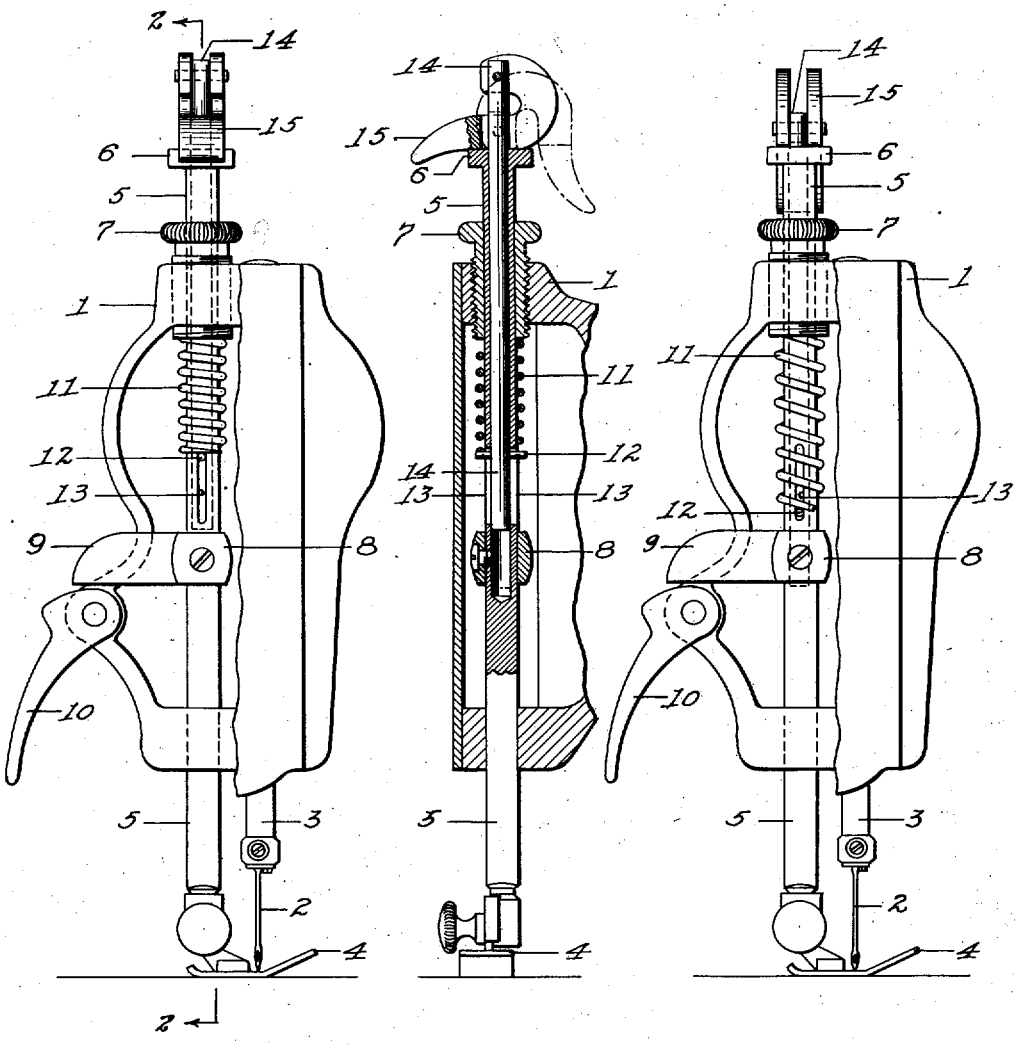
Figure 1 is a side elevation of the head of a sewing machine having my improved means applied thereto; the pressure of the foot being adjusted for ordinary sewing.
Figure 2 is an elevation in section as on line 2—2 of Figure 1.
Figure 3 is a view like Figure 1 but with the pressure adjusted for darning.

Referring now to the drawings and especially to Figures 1, 2 and 3, the head 1 of a sewing machine has the usual needle 2 and needle bar 3 and a presser foot 4. The latter is mounted on the lower end of a presser bar 5 which in accordance with my invention is hollow at its upper portion and is preferably provided with a flanged head 6. This bar passes through the customary pressure adjusting thumb screw 7, which screws into a tapped hole in the head, and the bar carries the usual block 8 from which extends an arm 9 to be engaged by a hand-lever 10 for raising or lowering the presser foot with respect to the material.

Around the bar is a coiled spring 11, the upper end of which rests against the inner end of the thumb-screw 7 and the lower end of which ordinarily exerts pressure directly on the presser foot bar. In my arrangement, however, the bottom end of this spring rests on a pin 12 which projects through diametrically opposed slots 13 provided in the bar near the lower end of its hollow portion. This pin is secured to a plunger 14 which is slidable in the hollow of the presser foot bar. The plunger extends a suitable distance above the head of the bar and at its upper end carries a cam lever 15. The latter is pivotally mounted on the plunger and as shown clearly in Figure 2 can be easily and quickly turned from the position shown in full lines to that shown in dotted outline.

When in the position shown in Figure 1, and in full lines in Figure 2, the cam lever holds the plunger in its upper position with respect to the presser bar. This effects compression of the spring and also what will be called the heavy pressure of the presser foot. That is, the spring being relatively tightly compressed exerts a heavy force against the pin 12 which is of course applied to the plunger 14. But this force is transmitted from the plunger by the cam lever 15 to the presser foot bar 5 and thence by the presser foot 4 to the material. This is the pressure used for ordinary sewing and it may be particularly adjusted or determined by a proper setting of the thumb-screw 7.

Instead of laboriously turning this thumb-screw to obtain a presser foot pressure suitable for darning, the invention avoids any such turning whatever and enables the operator to obtain the desired darning pressure by simply flipping the cam lever 15 from its full line position of Figure 2 to the position shown in dotted outline in this same figure and in full lines in Figure 3. This shifting of the hand lever permits the plunger 14 and pin 12 to descend with respect to the presser bar 5 and thus enables the spring to expand and thereby exert less force on the pin. As previously described this force is finally applied by the presser foot thus giving what may be termed the light pressure of the presser foot.

Note that in changing from heavy to light pressure, and vice versa, the position of the presser foot itself is not altered. It remains properly positioned to strip the material from the needle and gives the proper pressure on the work for either sewing or darning.

Figure 4:
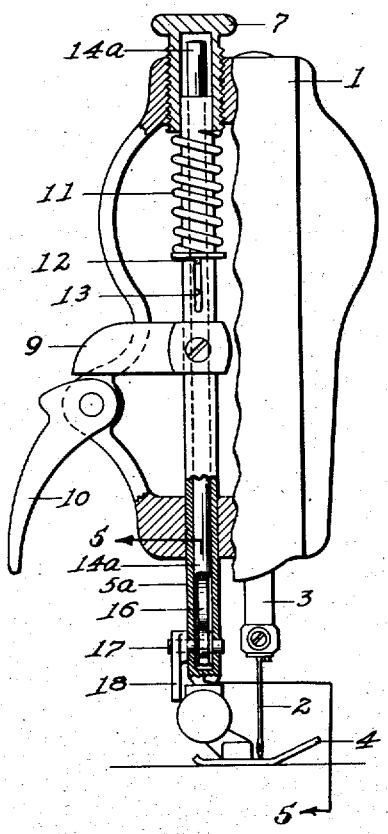
Figure 4 is a side elevation, partly in section, showing a modified form of the pressure adjusting means.
Figure 5:
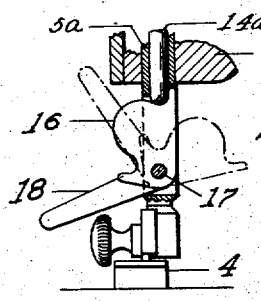
Figure 5 is an elevation in section on line 5—5 of Figure 4.

In the modification shown in Figures 4 and 5 the presser foot bar 5a is hollow throughout substantially its entire length. The plunger 14a is longer and is engaged at its lower end by a cam 16 carried by a shaft 17 which is pivotally mounted on the presser bar. A hand lever 18, also carried on the shaft 17, enables the cam to be swung between the position shown in full lines in Figure 5 to the position indicated in dotted outline. In one position the plunger is held upward with respect to the presser bar and the spring 11 is accordingly compressed thereby effecting the heavy pressure of the presser foot. In the other position, the plunger is in its lower position with respect to the presser bar and the light pressure of the presser foot is attained.

Figure 6:
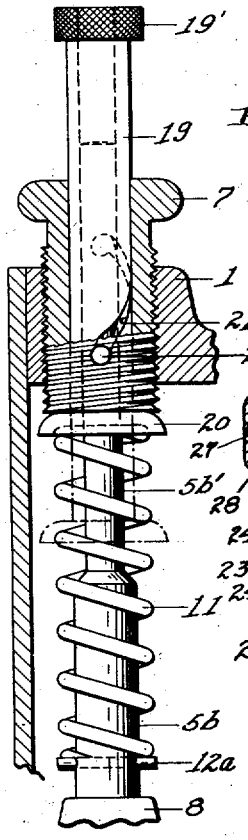
Figure 6 is an elevation, partly in section, showing still another form in which the principles of my invention may be embodied.

Figure 6 shows a solid presser bar 5b having a reduced upper portion 5b' slidable in and with respect to an extended sleeve 19. This in turn is slidable and rotatable within the thumb-screw 7. The bar carries a pin 12a against which the lower end of the spring 11 rests, its upper end resting against a suitable dished plate 20 on the lower end of the sleeve 19. The latter has a suitable slot 21 in its wall, in which extends another pin 22 secured to the thumb-screw 7. To vary the pressure in this embodiment of the invention, the knurled head 19' of the sleeve is grasped and rotated. The cam action between pin 22 and the slot 21 causes the sleeve to descend with respect to the presser bar to the position indicated in dotted outline thereby compressing the spring 11. This effects the heavy pressure of the presser foot, whereas with the sleeve in its upper position, as shown in full lines in Figure 6, the spring is extended and the light pressure of the presser foot effected.

Figure 7:
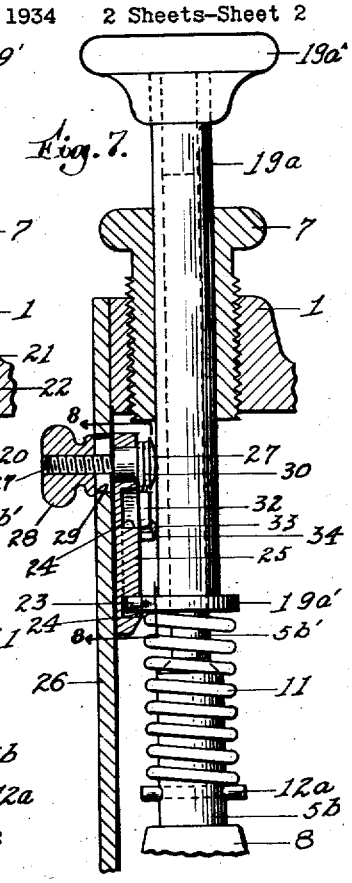
Figure 7 is an elevation, mostly in section, showing still another modification.
Figure 8:
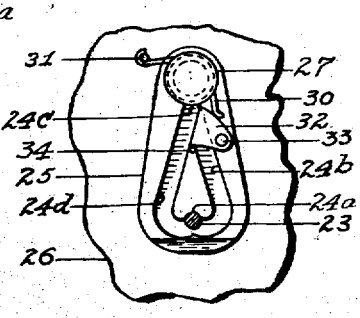
Figure 8 is an elevation taken as on line 8—8 of Figure 7.

In the modification shown in Figures 7 and 8, the presser bar 5b is like that of Figure 6 and has the pin 12a against which the lower end of spring 11 rests. The upper end of this spring rests against the flanged end 19a' of a sleeve 19a that extends beyond the thumb-screw 7 to terminate in a knob 19a''. The flanged end 19a' has a pin-like projection 23 extending into a cam groove 24 of a cam 25 pivotally mounted on the face plate 26. This mounting is by means of a suitable shouldered screw 27 which can be locked to the face plate by the thumb-nut 28 and is adjustable vertically of the head in the slot 29.

As shown in the drawings the projection 23 is resting in a suitable depression 24a in the groove 24 and when thus positioned the spring 11 is in compression and the heavy pressure is exerted by the presser foot. To adjust for light pressure, the operator presses down slightly on knob 19a'' thereby lowering the sleeve 19a and projection 23 so that the latter is clear of the depression 24a. A coiled spring 30, coiled about the pivot screw 27, is anchored at one end by the pin 31 on the plate and its other end presses against a trip 32 pivotally mounted on the cam at 33. The trip, as seen in Figure 8 is resting against a pin 34 being urged thereagainst by the spring 30. As the projection 23 leaves the depression 24a, the cam and the trip are swung together by the spring 30 toward the left. This permits the projection to pass upward through the portion 24b of the groove. When it reaches the trip 32 the latter rotates about its own pivot to permit the projection 23 to pass upward to the apex 24c of the groove, the trip swinging back against the pin 34. The spring 11 is now extended and the presser foot exerting the light pressure suitable for darning.

To restore the heavy or sewing pressure the operator merely pushes the sleeve 19a downward. The projection 23 is now guided by the trip 32 into the portion 24d of the groove and as it reaches the lower end thereof the cam is again urged to the left. A slight release on the knob 19a'' permits the projection to again enter the depression 24a in the groove whereupon the sleeve will be held in its illustrated position and the spring compressed for ordinary sewing.

The several modifications disclosed indicate the various means that may be employed to practice the principles of my invention but these modifications are not to be taken in a limiting sense but as purely representative of means whereby the pressure of the presser foot may be quickly and easily adjusted without variation in the operative position of the foot itself.

I claim:

1. Pressure adjusting means for the presser foot of a sewing machine comprising, in combination, a hollow presser bar carrying a presser foot; a plunger movable within the hollow of said bar; a spring arranged to impose its force on said plunger; and means for transmitting said force from said plunger to the presser bar including means for changing the relation of said plunger with respect to said bar to effect a different spring force and thereby effect a different pressure exerted by the presser foot.

2. Pressure adjusting means for the presser foot of a sewing machine comprising, in combination, a presser bar carrying a presser foot; a member movable with respect to said bar; a spring arranged to exert its force on said member; and means connecting said member and said bar for transmitting the force of said spring; the said connecting means being adjustable whereby the relative positions of said bar and member can be altered to vary the effect of the spring force on the bar.

3. Pressure adjusting means for the presser foot of a sewing machine comprising, in combination, a hollow presser bar having slots in its wall and carrying a presser foot; a member movable in the hollow of said bar and carrying a pin which extends through said slots; a spring coiled around said bar and resting on a said pin; a cam lever constituting an operative connection between said bar and member and adapted to be moved to vary the relation of said bar and member and thereby the force of said spring whereby different pressures may be exerted by said bar and presser foot.

4. Pressure adjusting means for the presser foot of a sewing machine comprising, in combination, a presser bar carrying a presser foot; a spring coiled about said bar with one end resting against a normally fixed abutment; a member against which the other end of the spring rests; and an adjustable connection between said member and the bar for transmitting the force of said spring to the bar and presser foot.

5. Pressure adjusting means for the presser foot of a sewing machine comprising, in combination, a presser member carrying a presser foot; a cylindrical plunger member arranged telescopically with respect to the presser member with their axes coincident; one of said members being hollow and the other of said members being movable within the said hollow; a spring coiled about the axes of both said members with one end resting against the plunger member and arranged to effect the pressure exerted by the presser foot; and means for holding the plunger member at different positions with respect to the presser member to vary the force of said spring and thereby change the pressure exerted by the presser foot without changing the position of the foot itself.

6. Pressure adjusting means for the presser foot of a sewing machine comprising, in combination, a presser bar carrying a presser foot, means resiliently urging said bar toward the work, means for adjusting the tension of said resilient means, and means for substantially releasing said tension to permit darning and the like.

7. Pressure adjusting means for the presser foot of a sewing machine comprising, in combination, a presser bar carrying a presser foot, a member movable with respect to said bar, a spring arranged to exert its force on said member, means for adjusting said movable member whereby the tension of said spring may be increased for sewing or substantially released for darning or the like, and means providing a relatively large number of adjustments of said movable member.

8. Pressure adjusting means for the presser foot of a sewing machine comprising, in combination, a presser bar carrying a presser foot, a member movable with respect to said bar, a spring arranged to exert its force on said member, means acting on said movable member to provide tension on said spring or substantial lack thereof, whereby said machine is alternatively available for sewing or for darning, and means acting on said movable member to provide a relatively large number of adjustments for the tension of said spring.

9. Pressure adjusting means for the presser foot of a sewing machine comprising, in combination, a presser bar carrying a presser foot, a helical spring coiled on said bar with one end resting against a normally fixed abutment, a member slidably arranged on said bar and adapted to oppose the other end of said spring, means acting on said slidable member to provide tension on said spring or substantial lack thereof, whereby said machine is alternatively available for sewing or for darning, and means acting on said slidable member to provide a relatively large number of adjustments for the tension of said spring.

ARTHUR L. CORSON.